United States Patent [19]
Snow

[11] 3,768,238
[45] Oct. 30, 1973

[54] EQUIPMENT FOR COLLECTING GRASS-CUTTINGS FROM A GRASS-MOWER

[75] Inventor: John Douglas Snow, Nuneaton, England

[73] Assignee: MacLaren Snow Limited, London, England

[22] Filed: Sept. 29, 1971

[21] Appl. No.: 184,777

[52] U.S. Cl. .................................. 56/199, 56/156
[51] Int. Cl. ...................... A01d 35/22, A01d 53/06
[58] Field of Search ............. 56/249, 254, 153–158, 56/500–505, 194–206; 37/41, 42, 43 A–43 L

[56] References Cited
UNITED STATES PATENTS
1,780,481  11/1930  Hale ...................................... 56/158
2,599,438  6/1952  Donning et al. ...................... 56/158

Primary Examiner—Russell R. Kinsey
Attorney—John A. Mawhinney

[57] ABSTRACT

A grass-box for collecting grass-cuttings from a grass-cutting machine, particularly a lawn-mower, and provided with equipment for transferring the grass-cuttings from the cutter of the machine and effecting compaction of the grass-cuttings in the grass-box. The transferring and compaction of the grass-cuttings is effected by an auger conveyor which is mounted with its longitudinal axis extending transversely of the grass-box to receive along substantially the whole of its length grass-cuttings as they are ejected by the cutter.

10 Claims, 3 Drawing Figures

PATENTED OCT 30 1973

EQUIPMENT FOR COLLECTING GRASS-CUTTINGS FROM A GRASS-MOWER

The invention relates to equipment for collecting grass-cuttings from a grass-mower.

It is known that the usual form of attachment to collect grass-cuttings from a grass-mower is a box having an open side adjacent a cutting cylinder of the grass-mower and extending transversely of the mower for at least the total axial length of the cutting cylinder. The box is usually detachable from the grass-mower to permit collected grass-cuttings to be emptied therefrom. Furthermore, the dimensions of the grass-box are generally governed by the size of the grass-mower to which it is to be attached, but is usually not of sufficient size to permit large areas of grass to be cut without emptying the grass-box. The disadvantage of frequently emptying the box can be both laborious and time-consuming, and the present invention is intended to reduce such disadvantages.

According to the invention, equipment for collecting grass-cuttings from a grass-mower comprises a grass-box having an opening extending transversely thereof to receive grass-cuttings, a member supported within the grass-box and operable to transfer collected grass-cuttings to an outlet leading from the grass-box such that upon operation of the transfer member the collected grass-cuttings will be compacted by the transfer member and extended thereby through the outlet, the equipment also comprising means for operating the transfer member.

The transfer member is conveniently an auger conveyor which is so supported that its longitudinal axis extends transversely of the grass-box to receive along substantially the whole of its length grass-cuttings as they are ejected by the grass-mower into the grass-box. The auger conveyor may comprise first and second screw portions, the first screw portion being of opposite hand to the second screw portion. Alternatively, the transfer member may be a reciprocatable plunger which is so supported that its direction of reciprocation extends transversely of the grass-box to receive grass-cuttings from the grass-mower in front of the plunger as the plunger is moved in its compacting stroke. Yet another form of transfer member may be rotary compressor of a kind other than an auger conveyor and arranged to receive grass-cuttings from the grass-mower and to extrude compacted grass-cuttings through the outlet.

The operating means for the transfer member preferably includes a first rotatable driving member drivingly engaged by a second rotatable driving member rotatable by a cutting cylinder drive mechanism in the grass-mower.

The invention also includes a grass-mower including equipment as set out in the three immediately preceding paragraphs.

Equipment for collecting grass-cuttings from a grass-mower in accordance with the invention will now be described by way of example with reference to the accompanying drawings, in which.

Figure 1:
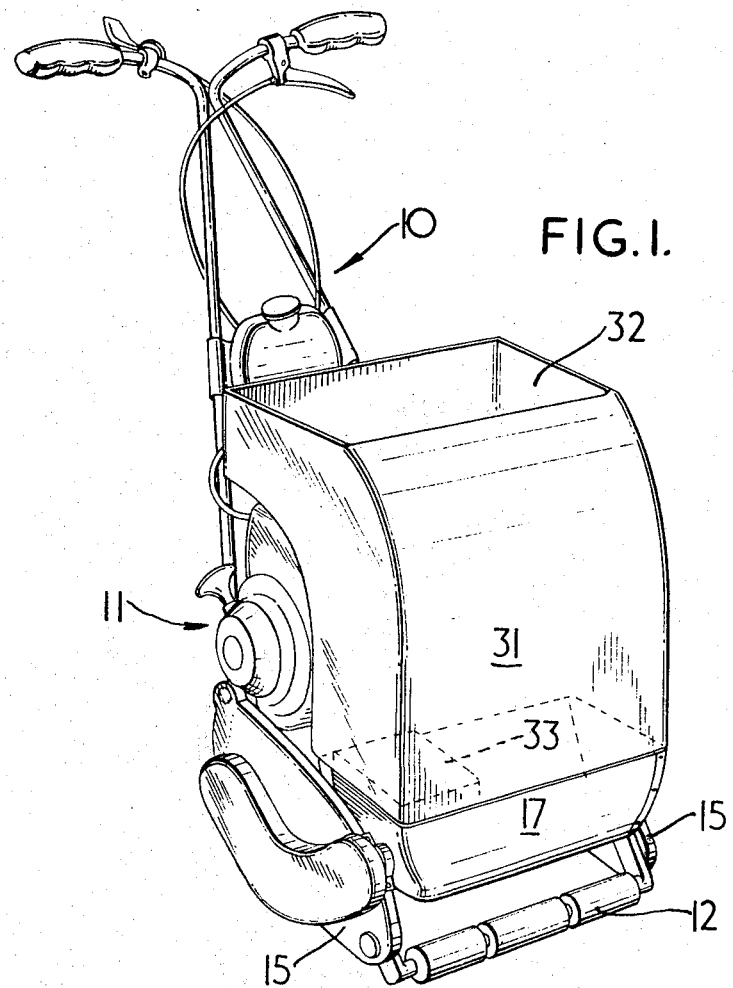
FIG. 1 is a perspective view showing one embodiment of the equipment in position on a motor-driven grass-mower.

Referring firstly to FIG. 1 which shows a conventional motor-driven grass-mower 10 having an engine unit 11, a rear roller (not shown) driven by the engine unit 11 and a front roller 12. A cutting cylinder 13 (FIG. 2) is secured between the front and rear rollers on a spindle 14 supported, for rotation, at each end by a side plate 15. The cutting cylinder 13 supports cutting blades 16 and is rotated by the rear roller via a belt or chain drive. A deflector plate (not shown) of substantially the same length as the cutting cylinder 13 and of the kind conventionally employed in grass-mowers of the cylinder type is supported adjacent one side of the cutting cylinder 13 between the latter and the rear roller. The deflector plate may be supported in conventional manner, e.g. by clips or screws, from any fixed member of the grass-mower 10, for example, the side plates 15. The deflector plate is so shaped to deflect grass, which has been cut by the cutting cylinder 13 and which is thrown against the deflector plate by the cutting blades 16, to the other side of the cutting cylinder remote from the deflector plate. A container, hereinafter referred to as a grass-box 17, to collect grass cut by the cutting cylinder 13 and deflected by the deflector plate is carried by the grass-mower 10. The grass-box 17 is carried by a fixed part of the grass-mower. For example it may be attached to the side plates 15 and is positioned adjacent the cutting cylinder 13 on the same side thereof as the front roller 12, so that the grass-box is on the side of the cutting cylinder remote from the deflector plate.

Figure 2:
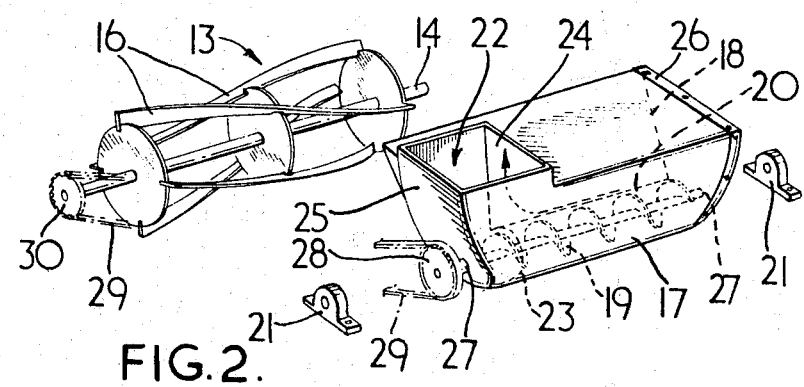
FIG. 2 is an exploded perspective view of the equipment shown in FIG. 1 together with a cutting cylinder of the grass-mower.

With reference now to FIG. 2, the grass-box 17 has an opening 18 extending transversely thereof adjacent the cutting cylinder 13 to receive grass-cuttings from the deflector plate. An auger conveyor 19 is supported at each end thereof for rotation within a trough-like lower portion 20 of the grass-box 17, by a bearing 21 which is secured outside the grass-box 17. The base of the trough-like portion 20 is curved such that the diameter of the curve is substantially equal to the outside diameter of the screw of the auger conveyor 19 and thereby ensures a minimum clearance between them. An outlet in the form of an upstanding tube 22 is provided adjacent one end of the trough-like portion 20 and has an inlet aperture 23 provided in a side wall 24 to receive the screw of the auger conveyor 19. Another side wall 25 of the outlet tube 22 opposite side wall 24 is curved such that it blends into the base of the trough-like portion 20 and also forms part of one end of the grass-box 17. The other end 26 of the grass-box 17 is removable to permit the screw of the auger conveyor 19 to be assembled within the grass-box and to permit the assembly, a hole 27 is provided in each of the end walls 25 and 26 to allow the auger spindle to pass through the bearings 21.

The screw of the auger conveyor 19 is driven by a sprocket wheel 28 which is secured by any suitable means to one end of the auger conveyor spindle which extends out of the end 25 of the grass-box 17. The sprocket wheel 28 engages an endless chain 29 driven by a further sprocket wheel 30 secured to the spindle 14 of the cutting cylinder 13.

In operation of the grass-mower, grass which is cut by the cutting cylinder 13 is thrown against the deflector plate by the cutting blades 16 and deflected by the deflector plate into the opening 18 of the grass-box 17 and falls into the trough-like portion 20 of the grass-box. As the auger conveyor 19 is rotating the collected grass-cuttings will be transferred thereby, from where they have fallen in the trough-like portion 20 of the grass-box 17, along the length of the grass-box into the inlet aperture 23 of the outlet tube 22. Further grass-cuttings deposited in the grass-box 17 from the deflector plate will also be transferred into the inlet aperture 23 of the outlet tube 22. A continuous transfer of collected grass-cuttings from the grass-box 17 into the inlet aperture 23 will occur causing a gradual build-up of grass-cuttings in the outlet tube 22. The continual rotation of the screw of the auger conveyor 19 will compact the grass-cuttings as they are transferred along its length and due to the side wall 25 of the outlet tube 22 being curved, grass-cuttings entering the outlet tube 22 will be further compacted together and extruded from the outlet tube 22 in the form of a continuous compacted block. It will also be appreciated that once the grass-cuttings are being extruded from the outlet tube 22, the weight of the compacted grass-cuttings which fill the outlet tube 22 will further increase the compacting of subsequent grass-cuttings in the outlet tube 22. The extruded block of compacted grass-cuttings is delivered from the outlet tube 22 into a container 31 (FIG. 1) which rests on the top of the grass-box 17 and has an open top 32 through which the compacted grass-cuttings can be emptied and an opening 33 in its base to accommodate the outlet tube 22.

Figure 3:
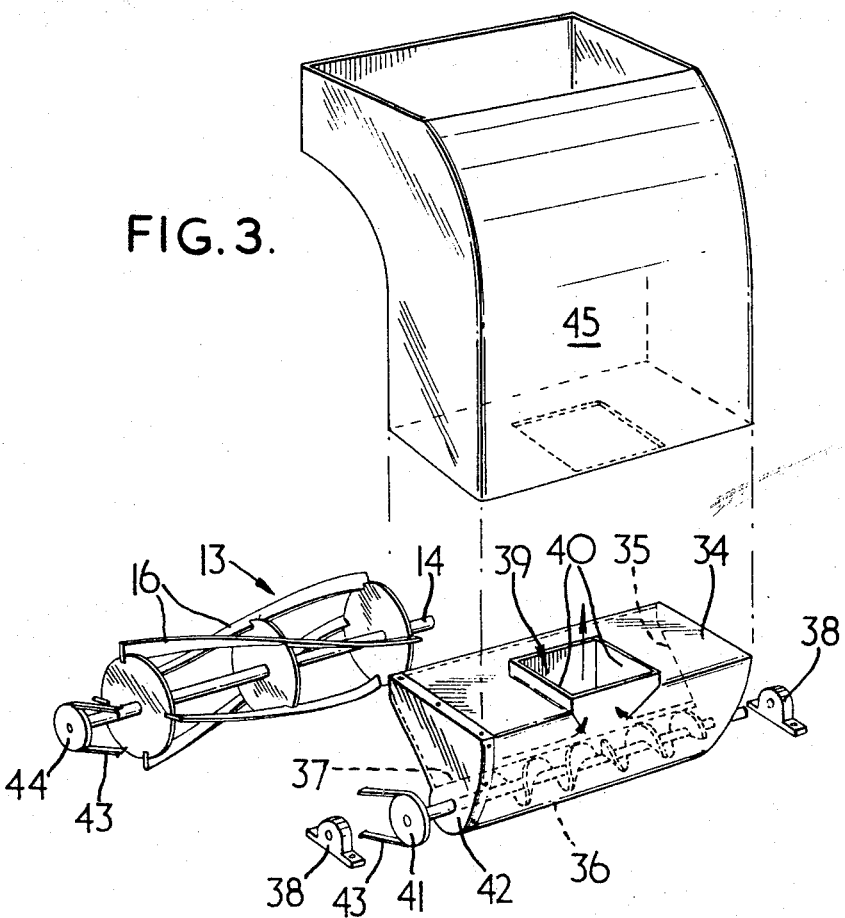
FIG. 3 is an exploded perspective view similar to FIG. 2 showing another embodiment of the equipment together with the cutting cylinder of the grass-mower.

FIG. 3 shows the second embodiment in which like parts shown in FIG. 2 have been given the same reference numerals and will not be described in detail. Also the grass-mower (not shown) is the same as that described and illustrated in FIG. 1. FIG. 3 shows a grass-box 34 to be carried and attached to the grass-mower adjacent the cutting cylinder 13 in a manner similar to that described with reference to FIG. 1. The grass-box 34 has an opening 35 extending transversely thereof adjacent the cutting cylinder 13 to receive grass-cuttings from the deflector plate. An auger conveyor 36 is supported for rotation in a similar manner to that described with reference to FIG. 2 within a trough-like lower portion 37 of the grass-box 34 by bearings 38. The base of the trough-like portion is curved and has a diameter substantially equal to the outside diameter of the screw of the auger conveyor 36. An outlet in the form of an upstanding tube 39 is provided centrally in the trough-like portion 37 and has two inlet apertures (not shown) provided one in each of a pair of opposed side walls 40 to receive the auger conveyor 36. The screw of the auger conveyor 36 is provided along one half of its length with a screw portion of opposite hand to the screw portion provided along the other portion thereof such that the feed of the screw of the auger conveyor is from its ends towards its centre. The screw of the auger conveyor 36 is driven by a pulley wheel 41 which is secured in any suitable manner to the appropriate one end of the auger conveyor spindle which extends out of one end 42 of the grass-box 34. The pulley wheel 41 co-operates with an endless belt 43 driven by a further pulley wheel 44 secured to the spindle 14 of the cutting cylinder 13. The end 42 of the grass-box 34 is removable to permit the screw of the auger conveyor 36 to be located within the trough-like portion 37 of the grass-box.

The operation of the grass-mower 10 and the auger conveyor 36 is the same as that described with reference to FIGS. 1 and 2, except that the collected grass-cuttings in the trough-like portion 37 of the grass-box 34 will be transferred to the centre of the grass-box into the outlet tube 39. The grass-cuttings will be compacted by the auger conveyor 36 and the weight of compacted grass-cuttings in the outlet tube 39. As in the embodiment described with reference to FIGS. 1 and 2 the compacted grass-cuttings are extruded from the outlet tube 39 into a container 45 having an open top and an opening in its base to accommodate the outlet tube 39.

Instead of the auger conveyor 19 (FIG. 2) being driven by the sprocket wheels 28 and 30 and the chain 29, they could be replaced by the pulley wheels 41 and 44 and the belt 43 as shown in FIG. 3 and vice-versa. Alternatively, the auger conveyor 19 or 36 may be driven by a pair of meshing gear wheels or a gear train may be provided instead. Instead of the auger conveyor 19 or 36 being driven from the cutting cylinder spindle 14 any other drivable member of the grass-mower may be used, for example, a roller or the power unit. Provision may also be made to include a variable-speed transmission to the auger conveyor 19 or 36, such that the screw of the auger conveyor may be rotated at a slower rate than the cutting cylinder or at the same rate. The direction of rotation of the screw of the auger conveyor 19 or 36 may be governed by a one-way drive device.

The outlet tube 22 or 39 may alternatively have its outlet of smaller cross-sectional area than the respective inlet or inlets. The outlet may, if desired, alternatively be arranged in a side wall of the respective outlet tube. In such a case the outlet would be positioned above the top of the respective grass-box 17 or 34 such that it projects into the respective container 31 or 45. The outlet tube 22 or 37 may have a progressively reducing cross-sectional area from the respective inlet or inlets to the respective outlet.

Additionally a regulator may be provided in the outlet tube and may be in the form of a spring-loaded plunger having an ejector face against which the compacted grass-cuttings are forced. The grass-cuttings will also be further compacted by the action of moving the spring-loaded plunger and by the reduced cross-sectional area of the outlet. As the plunger is moved by the compacted grass-cuttings the ejector face of the plunger directs the compacted grass-cuttings towards the outlet, whereupon further movement of the plunger opens the outlet through which the compacted grass-cuttings are extruded and guided by the ejector face.

The auger conveyor 19 may alternatively be replaced by a reciprocatable plunger which may be provided with a flexible bellows-like cover to prevent a build-up of grass-cuttings behind the inoperative end of the plunger.

If desired, the auger conveyor 19 or 26 may be replaced by any other suitable rotary compressor.

It will be appreciated that the grass-box 17 or 34 may be in an integral part of the grass-mower 10 which may be manually driven instead of motor-driven. In the latter case the rotation of the cutting cylinder as a result of pushing the mower would also operate the conveyor means, e.g. the auger conveyor 19 or 36.

What I claim as my invention and desire to secure by Letters Patent of the United States is:-

1. Equipment for collecting grass-cuttings from a grass-mower having a rotatable cutter and drive mechanism therefor, the equipment comprising a container having an opening extending longitudinally thereof to receive grass-cuttings and a trough-like lower portion in which the grass-cuttings are collected, an outlet tube upstanding from said container and leading from said trough-like portion, a transfer member supported within the trough-like portion and operable to transfer grass-cuttings collected in said trough-like portion to said outlet tube, a collecting receptacle supported by said container and having an opening therein to accommodate said outlet tube, the grass-cuttings being compacted by said transfer member during transfer of the grass-cuttings from said trough-like portion to said outlet tube, said outlet tube having an upwardly directed curved wall portion to effect further compacting of the grass-cuttings as they are transferred by said transfer member into said outlet tube, such that compacted grass-cuttings will be extruded through said outlet tube by said transfer member and will be collected in said collecting receptacle, and means for operating said transfer member and interconnecting said transfer member with said cutter drive mechanism for the grass-mower.

2. Equipment as claimed in claim 1 in which the transfer member is an auger conveyor which is supported with its longitudinal axis extending longitudinally of said trough-like portion to receive along substantially the whole of its length grass-cuttings as they are ejected by the grass-mower into said trough-like portion.

3. Equipment as claimed in claim 2 in which the auger conveyor comprises first and second screw portions, the first screw portion being of opposite hand to the second screw portion.

4. Equipment as claimed in claim 1 in which said operating means for said transfer member includes a first rotatable driving member and a second rotatable driving member drivingly interconnecting said first rotatable driving member and rotatable by the cutter drive mechanism of the grass-mower.

5. Equipment as claimed in claim 4 in which said first rotatable driving member is a first toothed wheel drivingly connected to the transfer member and said second rotatable driving member is a second toothed wheel driven by the cutter drive mechanism, said operation means also including an endless chain drivingly interconnecting said first and second toothed wheels.

6. Equipment as claimed in claim 4 in which said first rotatable driving member is a first pulley wheel drivingly connected to said transfer member and said second rotatable driving member is a second pulley wheel driven by the cutter drive mechanism, said operating means also including an endless belt drivingly interconnecting said first and second pulley wheels.

7. Equipment as claimed in claim 1 in which the transfer member extends into said outlet tube, said outlet tube having a wall defining an inlet aperture through which grass-cuttings are transferred.

8. A grass-mower having a rotatable cutter and a drive mechanism therefor, and including equipment for collecting grass-cuttings from said rotatable cutter, said equipment comprising a container supported by the grass-mower adjacent said rotatable cutter and having an opening extending longitudinally thereof to receive grass-cuttings which are deflected into said opening by said rotatable cutter and also having a trough-like lower portion in which the grass-cuttings are collected, an outlet tube upstanding from said container and leading from said trough-like portion, a transfer member supported within the trough-like portion and operable to transfer grass-cuttings collected in said trough-like portion to said outlet tube, a collecting receptacle supported by said container and having an opening therein to accommodate said outlet tube, the grass-cuttings being compacted by said transfer member during transfer of the grass-cuttings from said trough-like portion to said outlet tube, said outlet tube having an upwardly directed curved wall portion to effect further compacting of the grass-cuttings as they are transferred by said transfer member into said outlet tube, such that compacted grass-cuttings will be extruded through said outlet tube by said transfer member and will be collected in said collecting receptacle, and means for operating said transfer member and interconnecting said transfer member with said cutter drive mechanism.

9. A grass-mower as claimed in claim 8 in which the transfer member is an auger conveyor which is supported with its longitudinal axis extending longitudinally of said trough-like portion to receive along substantially the whole of its length grass-cuttings as they are ejected by the grass-mower into said trough-like portion.

10. A grass-mower as claimed in claim 9 in which the auger conveyer comprises first and second screw portions, the first screw portion being of opposite hand to the second screw portion.

* * * * *